United States Patent
Wysocki et al.

(10) Patent No.: US 7,079,192 B1
(45) Date of Patent: Jul. 18, 2006

(54) LETTER BOX LINE BLACKENER FOR THE HDTV/CONVENTIONAL-ANALOG HYBRID SYSTEM

(75) Inventors: Frederick J. Wysocki, Los Alamos, NM (US); George H. Nickel, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 730 days.

(21) Appl. No.: 10/209,147

(22) Filed: Jul. 30, 2002

(51) Int. Cl.
*H04N 5/46* (2006.01)

(52) U.S. Cl. .................. 348/558; 348/607; 348/913; 348/556

(58) Field of Classification Search ............. 348/558, 348/556, 555, 607, 913, 445
See application file for complete search history.

(56) References Cited

U.S. PATENT DOCUMENTS

| | | | | |
|---|---|---|---|---|
| 5,274,449 A | * | 12/1993 | Keesen | 348/469 |
| 5,384,599 A | * | 1/1995 | Casavant et al. | 348/473 |
| 5,841,479 A | * | 11/1998 | Van Gestel et al. | 375/240.01 |
| 5,973,749 A | * | 10/1999 | Ishii et al. | 348/558 |
| 6,330,037 B1 | * | 12/2001 | Nakajima et al. | 348/607 |
| 6,621,927 B1 | * | 9/2003 | Mori et al. | 382/173 |
| 6,751,256 B1 | * | 6/2004 | Nickel | 375/240.01 |

* cited by examiner

*Primary Examiner*—Victor R. Kostak
(74) *Attorney, Agent, or Firm*—Milton D. Wyrick; Mark N. Fitzgerald

(57) ABSTRACT

A blackener for letter box lines associated with a HDTV/conventional-analog hybrid television transmission where the blackener counts horizontal sync pulses contained in the HDTV/conventional-analog hybrid television transmission and determines when the HDTV/conventional-analog hybrid television transmission is in letter-box lines: if it is, then the blackener sends substitute black signal to an output; and if it is not, then the blackener sends the HDTV/conventional-analog hybrid television transmission to the output.

4 Claims, 1 Drawing Sheet

LETTER BOX LINE BLACKENER FOR THE HDTV/CONVENTIONAL-ANALOG HYBRID SYSTEM

This invention was made with Government support under Contract No. W-7405-ENG-36 awarded by the U.S. Department of Energy. The Government has certain rights in the invention.

FIELD OF THE INVENTION

The present invention generally related to High Definition Television, and, more specifically to blackening of the letterbox lines associated with a HDTV/conventional-analog hybrid system whereby a 16×9 aspect ratio image is displayed on a conventional 4×3 aspect ratio conventional analog television screen. The conventional analog television could be based on NTSC, PAL, SECAM, or other similar format.

BACKGROUND OF THE INVENTION

The mandate of the United States Federal Communications Commission for manufacturers to move swiftly to High Definition Television (HDTV) broadcasting has met with only a tepid response. To date the availability of HDTV signals is very limited and the cost of HDTV receivers is still above the ability of much of the market to afford. To address this need for lower cost reception of HDTV signals, a related invention contained in U.S. patent application Ser. No. 09/714,723, filed Nov. 15, 2000, by George Nickel, teaches a method of transmitting HDTV digital signals with a NTSC analog format. This method can also be used with other conventional analog formats, such as PAL and SECAM. This allows viewing of a digital format on a conventional analog television set.

However, the picture on a conventional analog set has letterbox lines, or blackish lines above and below the 16×9 image, each letterbox line being ⅛ of the full height of the 4×3 screen. In the radio-frequency (RF) broadcast of the video signal, the letter box region can be used to contain information, like high-definition image digital data, or even data unrelated to the video image. Practical algorithms for inserting digital data into the conventional analog broadcast which have high data capacity likely may cause the letterbox lines to contain sparkle or some other time-varying structure instead of being completely black. These time-varying structures likely will be unacceptable to many television viewers. The present invention provides apparatus for intercepting the hybrid HDTV signal before it reaches the conventional television set and insure that the letter-box lines are totally black, without in any way disturbing the HDTV 16×9 image.

It is therefore an object of the present invention to provide apparatus for blackening letter-box lines in HDTV/conventional-analog hybrid systems.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, a blackener for letter box lines associated with HDTV/conventional-analog hybrid television signals comprises a radio-frequency tuner for tuning the HDTV/conventional-analog hybrid television signals and a horizontal sync pulse counter for counting horizontal sync pulses in HDTV/conventional-analog hybrid television signals to determine whether the HDTV/conventional-analog hybrid television signals are in a letter box area or an image area. A letter box line blackener sends a substitute black to an output for the HDTV/conventional-analog hybrid television signals when the horizontal sync pulses are in a letter box, and sending the HDTV/conventional-analog hybrid television signals directly to the output when the horizontal sync pulses are in the image area.

In a further aspect of the present invention and in accordance with its objects and purposes a blackener for letter box lines associated with HDTV/conventional-analog hybrid television signals comprises a radio-frequency tuner for tuning the HDTV/conventional-analog hybrid television signals and a vertical sync detector for detecting a specific vertical sync pulse sequence in the HDTV/conventional-analog hybrid television signals and outputting a signal after receipt of the specific vertical sync pulse sequence. A horizontal sync pulse counter receives the signal from the vertical sync detector for counting horizontal sync pulses to determine whether the HDTV/conventional-analog hybrid television signals are in a letter box area or an image area. A letter box line blackener sends a substitute black to an output for the HDTV/conventional-analog hybrid television signals when the horizontal sync pulses are in a letter box, and sends the HDTV/conventional-analog hybrid television signals directly to the output when the horizontal sync pulses are in the image area.

In a still further aspect of the present invention and in accordance with its objects and purposes a method of blackening letter-box lines during a HDTV/conventional-analog hybrid television transmission comprises the steps of receiving the HDTV/conventional-analog hybrid television transmission; counting horizontal sync pulses in the HDTV/conventional-analog hybrid television transmission to determine whether the HDTV/conventional-analog hybrid television transmission is in a letter-box area or an image area; sending a signal for black to an output when the horizontal sync pulses are in the letter box area and sending an image to the output when the horizontal sync pulses are in the image area.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
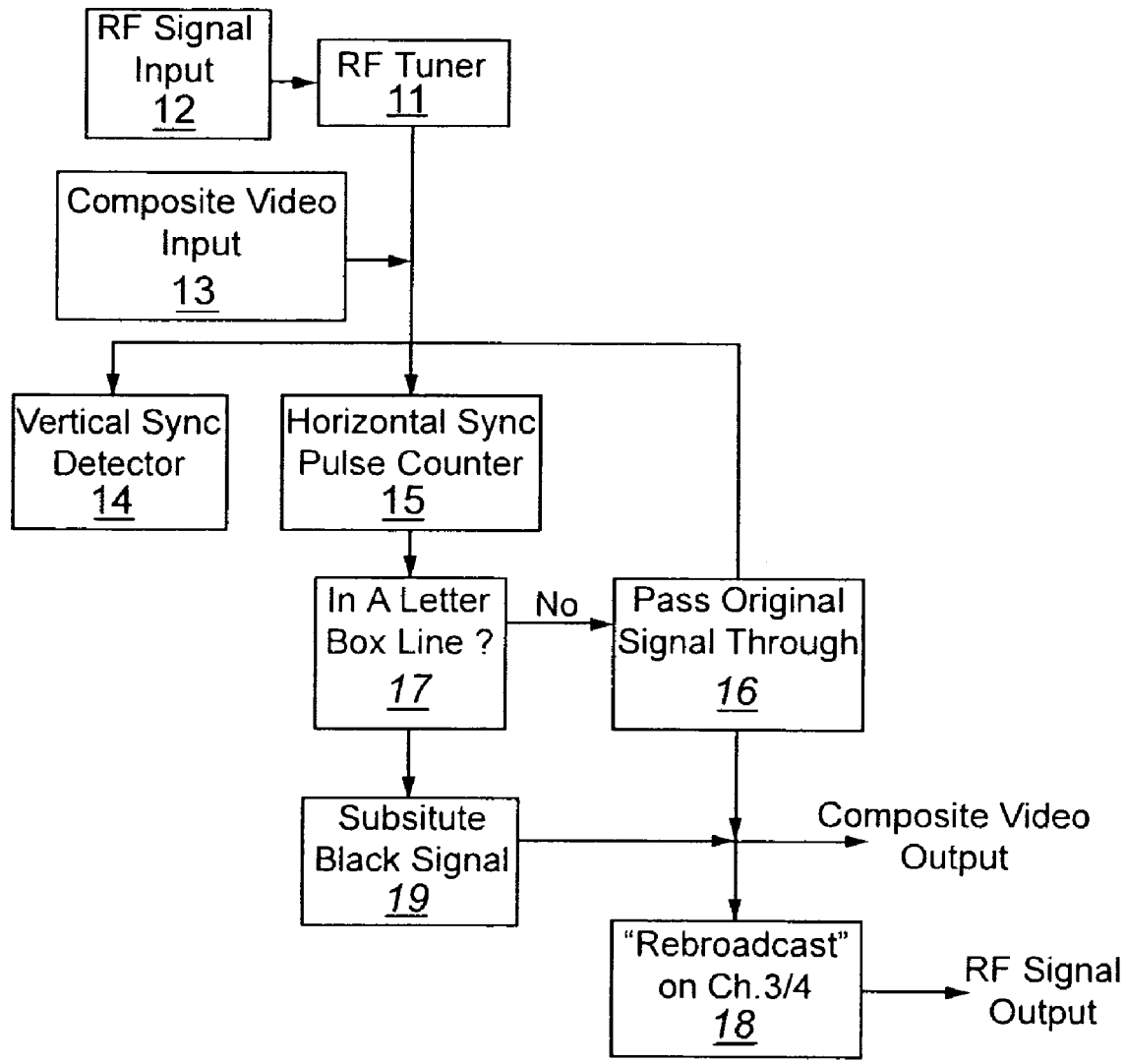
FIG. 1 is a block diagram of the elements of one embodiment of the present invention.

The present invention blackens the sometimes speckled letter-boxes present with HDTV/conventional-analog hybrid signals received by a conventional television set, meaning an analog television. The invention can be understood most easily through reference to the drawing.

In FIG. 1, there can be seen a block diagram illustrating the function of the present invention. As seen, the present invention has RF tuner 11 receiving RF signal 12 and passing the appropriate television channel, along with composite video input 13, if it is present, to vertical sync detector 14, horizontal sync pulse counter 15 and to pass original signal through 16. The output of vertical sync detector 14 is output also to horizontal sync counter 15.

The output of horizontal sync pulse counter 15 is connected to in a letter box 17, which provides a logic test as to whether the present RF signal 12 is within a letter-box line. If RF signal 12 is not within a letter-box line, a NO signal is sent to pass original signal through 17 and RF signal 12 is passed on to rebroadcast on Ch. 3–4 output 18.

If RF signal 12 is within a letter-box line, a YES signal is sent to substitute black signal 19. In substitute black signal 19, RF signal 12 is blocked and the appropriate signal level for black is to rebroadcast on Ch. 3–4 output 18 (Ch. 3 or 4 is appropriate for U.S. NTSC, different channels may be appropriate in countries other than the U.S.). The sound component of RF signal 12 is passed through to rebroadcast on Ch. 3–4 output 18 without any modification. The composite video 13 is available as an output, and RF signal 12 with black letter-box lines is provided to rebroadcast on Ch. 3–4 output 18, which like a common VCR is connected to the RF input on a conventional television set. Of course, as previously stated, output 18 can be set to be input to any appropriate channel in the country of use. The present invention would also have a by-pass switch (not shown) for disabling the letter-box blackening feature in the event the television being viewed is not in a letter-box format.

The following description uses the NTSC format as an example of the invention. For other formats, such as PAL and SECAM, the framework is the same, but specific details, such as exact line counts, will be different. In operation, vertical sync detector 14 locates the beginning of each NTSC half-frame, or top of frame, and restarts horizontal sync pulse counter 15, so that horizontal sync pulse counter 15 always counts from the top-of-frame. The "structure" of the vertical synchronization in RF signal 12 consists of 6 "equalizing" pulses followed by 6 "vertical" synchronization pulses, followed by 6 more "equalizing" pulses in a well-known specific sequence. Horizontal sync pulse counter 15 starts counting horizontal synchronization pulses (HSP) immediately after the second set of "equalizing" pulses. There are thirteen HSP, which start thirteen retrace lines, with closed-caption information on the 12$^{th}$ of these lines.

The number of HSP does not depend on whether the half-frame is an "odd" or "even" frame. There is a timing difference between the two types of frames for the time between the last "equalizing" pulse and the first HSP. However, since the present invention only needs to count pulses, this is of no consequence. After the retrace lines, there are thirty HSP and corresponding letter-box lines; then 180 HSP and corresponding image lines. Then come thirty HSP and the corresponding letter-box lines. This completes the half-frame, and another vertical synchronization pulse would occur.

The table below summarizes the logic of the present invention based on the HSP count. The right-hand column of the table summarizes the action taken on RF signal 12 following the pertinent HSP and until the next HSP.

TABLE

| Horiz. Sync pulse count | Line type | Action on video signal |
|---|---|---|
| 1–11 | Retrace | Pass through |
| 12 | Retrace/closed caption | Pass through |
| 13 | Retrace | Pass through |
| 14–43 | Letter-box | Block and substitute with black |
| 44–223 | Image | Pass through |
| 224–253 | Letter-box | Block and substitute with black |

Those skilled in this art will appreciate that the vertical synchronization pulses account for 9 or 10 "lines" worth of time, depending on whether the half-frame is even or odd. This means that 253*2+9+10=525 lines defined by a NTSC full frame.

For other analog formats, such as PAL and SECAM, the specific values of "Horiz. Sync pulse count" in the above table would be appropriately modified for the targeted analog format.

With the present invention installed on a conventional analog television set, the television would display on its screen totally black letter-box lines while receiving a HDTV program. This allows for pleasant viewing by an individual even though the letter-box lines, during letter-box time interval, could be very complex, being packed with data that may not even be related to the image being displayed.

In the future, if every viewer with a conventional analog television had the present invention installed, the idea of data insertion, while not preserving RF envelope characteristics, could be extended to the retrace lines (see TABLE) as well. With the retrace lines, the signal would be replaced with the "ultra-black" signal for retracing.

The foregoing description of the embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A blackener for letter box lines associated with HDTV/conventional-analog hybrid television signals comprising:
    a radio-frequency tuner for tuning said HDTV/conventional-analog hybrid television signals;
    a vertical sync detector for detecting a specific vertical sync pulse sequence in said HDTV/conventional-analog hybrid television signals and outputting a signal after receipt of said specific vertical sync pulse sequence;
    a horizontal sync pulse counter receiving said signal from said vertical sync detector for counting horizontal sync pulses to determine and output a logic test signal that indicates whether said HDTV/conventional-analog hybrid television signals are in a letter box area or an image area; and
    a letter box logic test that receives said logic test signal for blocking said HDTV/conventional-analog hybrid television signals and sends a substitute black signal to an output when said horizontal sync pulses are in a said letter box area, and sends said HDTV/conventional-analog hybrid television signals directly to said output when said horizontal sync pulses are in said image area.

2. The apparatus as described in claim 1 further comprising a rebroadcast circuit for receiving said output of said letter box logic test and rebroadcasting said substitute black signal and an image within said image area to a channel appropriate for an analog television set in use.

3. A method of blackening letter box lines during a HDTV/conventional-analog hybrid television signal comprising the steps of:
   receiving said HDTV/conventional-analog hybrid television signal;
   detecting a specific sequence of vertical sync pulses in said HDTV/conventional-analog hybrid television signal and outputting a signal to said step of counting horizontal sync pulses to begin counting said horizontal sync pulses;
   counting horizontal sync pulses in said HDTV/conventional-analog hybrid television signal to determine whether said HDTV/conventional-analog hybrid television signal is in a letter box area or an image area;
   blocking said HDTV/conventional-analog hybrid television signals when said horizontal sync pulses are in said letter box area; and
   sending a substitute black signal to an output when said horizontal sync pulses are in said letter box area and sending an image signal to said output when said horizontal sync pulses are in said image area.

4. The method as described in claim 3, further comprising the steps of receiving said output of said horizontal sync pulse counter; and rebroadcasting said substitute black signal and said image signal to a channel appropriate for an analog television set in use.

* * * * *